C. C. Converse.
Wood Pavement.
N° 94,284.      Patented Aug. 31, 1869.
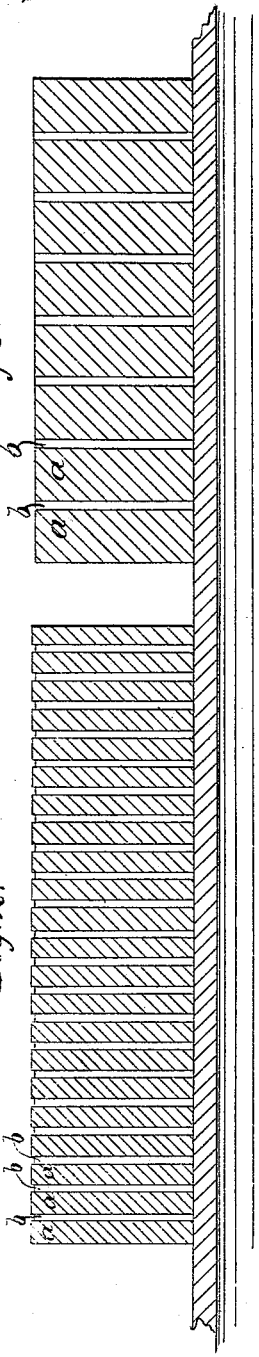
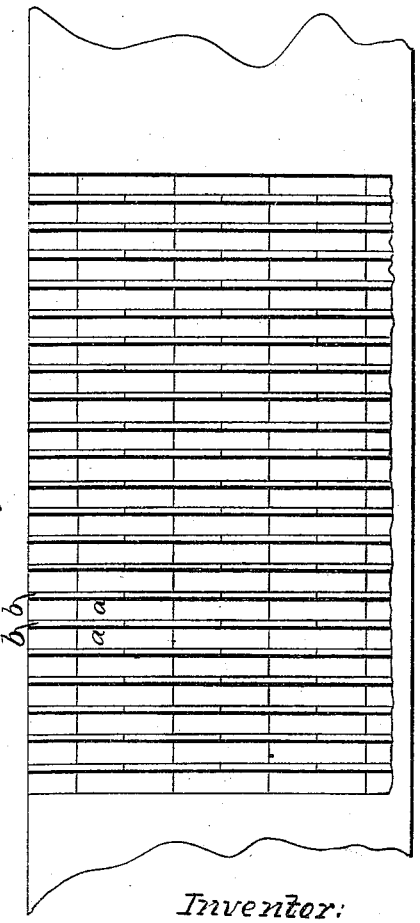
Witnesses:
Geo. F. Southern
Gustav Berg
Inventor:
C. C. Converse
By Van Santvoord & Hauff
his Atty

United States Patent Office.

CHARLES CROZAT CONVERSE, OF BROOKLYN, NEW YORK, ASSIGNOR TO SAMUEL S. GREELEY.

Letters Patent No. 94,284, dated August 31, 1869.

IMPROVED WOODEN PAVEMENT.

The Schedule referred to in these Letters Patent and making part of the same.

*To whom it may concern:*

Be it known that I, CHARLES CROZAT CONVERSE, of Brooklyn, in the county of Kings, and State of New York, have invented a new and useful Improvement in Pavements; and I do hereby declare that the following is a full, clear, and exact description thereof, which will enable those skilled in the art to make and use the same, reference being had to the accompanying drawing, forming part of this specification, in which drawing—

Figure 1 is a plan view of a pavement, made according to my invention.

Figure 2 is a vertical section of such pavement, the thin strips being represented as made flush with the blocks thereof.

Similar letters indicate corresponding parts.

This invention relates to pavements for highways or streets; and

It consists of rows of blocks, of rectangular form, arranged in rows with the grain vertical, and having between the rows strips of wood, of a width equal to the vertical length of the blocks, and arranged longitudinally with the grain, the longitudinal strips forming an even surface with the surface of the blocks, and both blocks and strips saturated with water-proof material.

This arrangement of blocks and strips affords a foothold for horses, through the more rapid abrasion of the strips. The blocks are separated from each other only by the strips.

The letters $a$ $b$ designate blocks and strips of wood, combined and arranged together to form the pavement. The blocks $a$ are cut or sawed across the grain, into pieces of suitable length, and are placed upright on their ends, so that their wearing-surfaces are transverse to the grain. The intermediate thinner strips are placed lengthwise the grain.

In making the pavement, I form on the ground a suitable bed, which is rounded up in the usual manner from each side towards its middle line, so that water will run from the middle of the street toward its sides.

Upon this bed I lay a covering of boards or plank, close together, and preferably with their sides toward the curbs of the street. The boards or planks of this covering may be saturated with coal-tar, or other equivalent water-proof material, or simply coated therewith.

This wooden covering receives the blocks and strips $a$ $b$, which are placed thereon, so that the strips $b$ occupy the interspaces of the rows of blocks $a$.

The blocks $a$ are intended to sustain the principal part of the wear and tear of travel, and they are consequently made wider than the strips $b$, so as to form the larger portion of the surface of the pavement. Said blocks $a$ are placed next each other in a row extending across the street, and the strips $b$ are placed behind and before them in the manner shown in the drawing.

The height of the strips $b$ is equal to the length of the blocks $a$, and they are so laid as to break joints, as shown in fig. 3.

The blocks and strips are saturated or coated with coal-tar, or other water-proof material, in any convenient manner. The ends of the several rows abut against the curb of the roadway.

After the pavement is laid, an additional coating of water-proof material may be poured or spread thereon, pure, or mixed with sand or gravel.

I do not confine myself to the precise length of the strips shown, as these strips may be extended any convenient distance across the street.

What I claim as new, and desire to secure by Letters Patent, is—

A pavement, constructed of rows of blocks, of rectangular form, arranged in rows, with the grain vertical, and having between the rows strips of wood of a width equal to the length of the blocks, and arranged longitudinally with the grain, the longitudinal strips forming an even surface with the surface of the blocks.

The above specification signed by me, this 16th day of May, 1867.

CHARLES CROZAT CONVERSE.

Witnesses:
G. BERG,
J. VAN SANTVOORD.